United States Patent [19]

Yanaga

[11] 4,319,496
[45] Mar. 16, 1982

[54] FORK ROD SLIDABLY SUPPORTING DEVICE FOR TRANSFER OF VEHICLES

[75] Inventor: Norihide Yanaga, Yokohama, Japan

[73] Assignee: Nissan Motor Co., Ltd., Yokohama, Japan

[21] Appl. No.: 106,245

[22] Filed: Dec. 21, 1979

[30] Foreign Application Priority Data

Jan. 8, 1979 [JP] Japan .................. 54-87[U]

[51] Int. Cl.³ .................. G05G 9/12; F16C 29/02
[52] U.S. Cl. .................. 74/473 R; 308/3 R; 308/4 R
[58] Field of Search .................. 74/473 R, 475, 476, 74/477; 308/3 R, 4 R

[56] References Cited

U.S. PATENT DOCUMENTS

| | | | |
|---|---|---|---|
| 1,666,781 | 4/1928 | Kaser | 74/473 R |
| 2,522,994 | 9/1950 | Coggeshall | 308/3 R X |
| 2,965,418 | 12/1960 | Edler | 308/15 |
| 3,034,425 | 5/1962 | Huetter | 308/3 R X |
| 3,167,366 | 1/1965 | Freund | 308/238 |
| 3,282,122 | 11/1966 | Magg et al. | 74/473 R |

FOREIGN PATENT DOCUMENTS

| | | |
|---|---|---|
| 272010 | 6/1969 | Australia . |
| 1826026 | 4/1959 | Fed. Rep. of Germany . |
| 1455674 | 12/1969 | Fed. Rep. of Germany . |
| 79641 | 11/1971 | Fed. Rep. of Germany . |

Primary Examiner—Allan D. Herrmann
Attorney, Agent, or Firm—Thompson, Birch, Gauthier & Samuels

[57] ABSTRACT

In a manually operable vehicle transmission a fork rod is slidably supported at both its ends by supporting holes provided in opposed transmission case walls. The fork rod is provided at its center with a shift fork for moving a coupling sleeve toward a gear to be selected. Between the surface of each supporting hole and the fork rod is interposed a ridge-shaped portion having a width which is smaller than that of the transmission case wall in the axial direction of the fork rod. The ridge-shaped portion serves to reduce resistance against the sliding movement of the fork rod.

11 Claims, 11 Drawing Figures

FORK ROD SLIDABLY SUPPORTING DEVICE FOR TRANSFER OF VEHICLES

BACKGROUND OF THE INVENTION

1. Field of the Invention

This invention relates to a device for slidably supporting a fork rod in a manually operable transmission for an industrial vehicle, 4-wheeled vehicle or the like.

2. Description of the Prior Art

Heretofore it has been the common practice to slidably support both ends of the fork rod by having it extend through supporting holes provided in opposed transmission case walls. The fork rod is provided at its center with a shift fork adapted to move a coupling sleeve toward a gear to be selected. A disadvantage of this type of arrangement is that when the fork rod is moved a heavy load is imposed on a region between the ends of the fork rod and the supporting holes, thereby making it difficult to slidably move the fork rod.

SUMMARY OF THE INVENTION

An object of the invention, therefore, is to provide a fork rod supporting device which can eliminate the above mentioned disadvantage.

A feature of the invention is the provision in a fork rod supporting device wherein the fork rod is slidably supported at its both ends by supporting holes provided in transmission case walls, of the improvement comprising a ridge-shaped portion interposed between said fork rod and said supporting holes and having a width which is smaller than that of said transmission case wall in the axial direction of the fork rod.

Further objects and features of the invention will be fully understood from the following description with reference to the accompanying drawings, wherein:

DETAILED DESCRIPTION OF THE PREFERRED EMBODIMENTS

Figure 1:
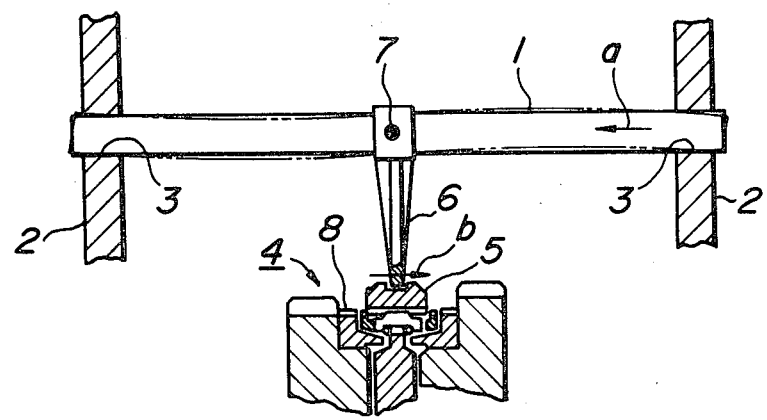
FIG. 1 is a cross-sectional view of a conventional fork rod supporting device and FIGS. 2 to 11 are cross-sectional views of essential parts of various embodiments of a fork rod supporting device according to the invention.

Referring to FIG. 1, reference numeral 1 designates a fork rod used for a manually operable vehicle transmission. The fork rod 1 is slidably supported at its ends by supporting holes 3, 3 each provided in a transmission case wall 2. To the center portion of the fork rod 1 is connected one end of a shift fork 6 by means of a roll pin 7. The other end of the shift fork 6 engages with a coupling sleeve 5 of a synchronous gear mechanism 4.

If the fork rod 1 is moved in the direction shown by arrow a, for example, the shift fork 6 made integral with the fork rod 1 is also moved in the same direction to bring the coupling sleeve 5 into engagement with a clutch gear 8 of a gear to be selected.

As a result, it is possible to select a corresponding speed change stage.

If the fork rod 1 is moved in the direction shown by the arrow a, the coupling sleeve 5 functions to apply a reaction force to the shift fork 6 in a direction shown by an arrow b, and as a result, the reaction force causes the shift fork 6 to be subjected to a bending moment in the corresponding direction.

If the manual transmission is kept at a low temperature or functions to shift a high speed stage to a low speed stage, the reaction force b becomes large so that the bending moment becomes extremely large, thereby tending to deform the fork rod 1 from its rectilinear condition shown by the solid lines into a bent condition shown by the dot-dash lines.

In the conventional fork rod supporting device shown in FIG. 1, however, each end of the fork rod 1 is supported by the overall thickness of the transmission case wall 2 and hence could not be deformed into the bent condition shown by the dot-dash line. As a result, each end of the fork rod 1 is forcedly inclined with respect to the transmission case wall 2 such that a fork rod supporting region, that is, a slidable contact region formed between each end of the fork rod 1 and the supporting hole 3 is subjected to a heavy load. Thus, resistance of the slidable contact region against the slidable movement of the fork rod 1 is increased, thereby rendering it difficult to move the fork rod 1.

In order to enable the fork rod that tends to incline to be slidably supported, it is necessary to make the length of the slidable contact region as short as possible so as to absorb the inclining force of the fork rod. The invention is based on the above mentioned recognition and provides a fork rod supporting device constructed such that the above mentioned recognition can be realized.

The invention will now be described with reference to FIGS. 2 to 11.

Figures 2, 3:
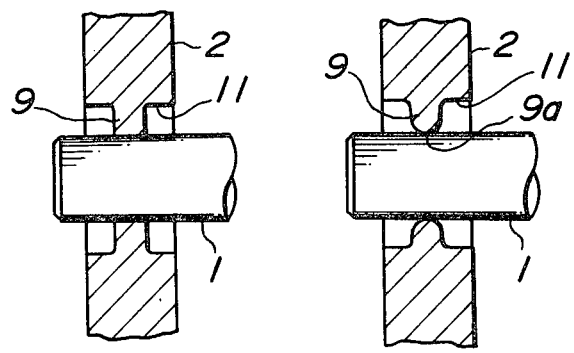

FIG. 2 shows a first embodiment of the invention wherein the transmission case wall 2 is provided at its supporting hole 11 with a ridge-shaped portion composed of an annular ridge 9 made integral with the peripheral surface of the supporting hole. The annular ridge 9 functions to slidably support the fork rod 1 and has a thickness which is as thin as possible within a range allowable by restrictions such as strength or the like. This arrangement makes it possible to deform the fork rod 1 substantially without restrictions when the fork rod 1 is inclined and deformed. That is, even when the fork rod 1 is inclined with respect to the transmission case wall 2, the resistance of the annular ridge 9 against the slidable movement of the fork rod 1 is substantially not increased. Such ability is exhibited by making the thickness of the annular ridge 9 in the axial direction of the fork rod 1 small.

Figure 4:
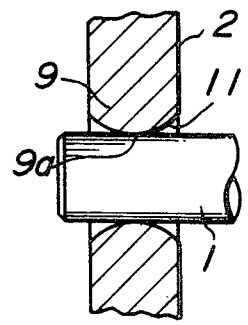

FIGS. 3 and 4 show second and third embodiments of the invention, respectively. In the embodiments shown in FIGS. 3 and 4, an annular ridge 9 is made arcuate in section so as to make the length of that portion 9a of the annular ridge 9 which makes contact with the fork rod 1 extremely small, thereby effectively allowing the fork rod 1 to deform as shown by dot-dash lines in FIG. 1.

Figure 5:
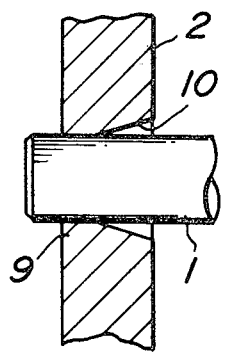

FIG. 5 shows a fourth embodiment of the invention wherein contrary to the embodiments shown in FIGS. 2, 3 and 4, the annular ridge 9 is not located at the center of the transmission case wall 2, but is located at the outer peripheral surface of the speed change gear case wall 2. This is preferably accomplished by machining the hole 10 with a taper.

Figure 6:
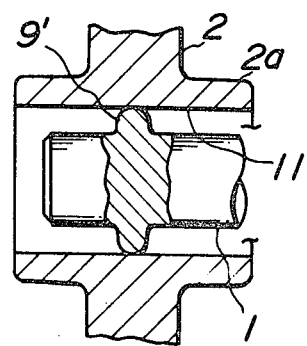

FIG. 6 shows a fifth embodiment of the invention wherein an annular ridge 9' is made integral with that portion of the peripheral surface of the fork rod 1 which is opposed to the peripheral surface of a supporting hole 11. The annular ridge 9' has the same ability as the annular ridge 9 made integral with the peripheral surface of the supporting hole 3 shown in FIGS. 2 to 5. In this embodiment, the supporting hole 11 is formed by an annular boss portion 2a made integral with the transmission case wall 2 and having a width in the axial direction of the fork rod 1 which is larger than that of the transmission case wall 2 so as to enlarge the contact region of the fork rod 1 with the transmission case wall 2 and prevent the annular ridge 9' from slipping off the boss portion 2a when the fork rod 1 is shifted.

FIGS. 7 to 11 shows sixth to tenth embodiments of the invention. In the previous embodiments shown in FIGS. 2 to 5, the annular ridge 9 is made integral with the transmission case wall 2, while in the previous embodiment shown in FIG. 6, the annular ridge 9' is made integral with the fork rod 1. It is not always necessary to make these annular ridges 9, 9' integral with the transmission case 2 and the fork end 1, respectively.

In the embodiments shown in FIGS. 7 to 11, an annular ridge is composed of a separate annular ridge body.

Figure 7:
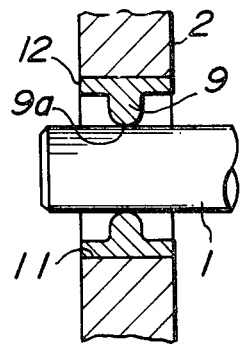

FIG. 7 shows a sixth embodiment of the invention wherein an annular ridge is composed of a separate annular body 12 provided at the center of its inner peripheral surface with an annular ridge 9 which is the same as that shown in FIG. 3. Body 12 is press fitted into a supporting hole 11 provided in the transmission case wall 2.

Figure 8:
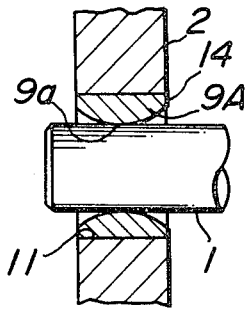

FIG. 8 shows a seventh embodiment of the invention wherein a separate annular body 14 provided at its inner peripheral surface with an arcuate ridge 9A which is the same as that shown in FIG. 4 is press fitted under pressure in the supporting hole 11 provided in the transmission case wall 2.

Figure 9:
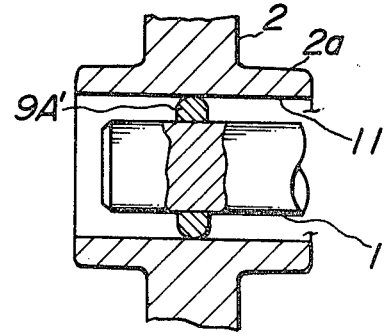

FIG. 9 shows an eighth embodiment of the invention wherein a separate annular ridge body is composed of a separate ring 9'A provided at its inner periphery with a flat surface and press fitted on the fork rod 1 and makes contact with the supporting hole 11 formed in the peripheral surface of the boss portion 2a of the transmission case wall 2 in the same manner as in the case shown in FIG. 6.

Figure 10:
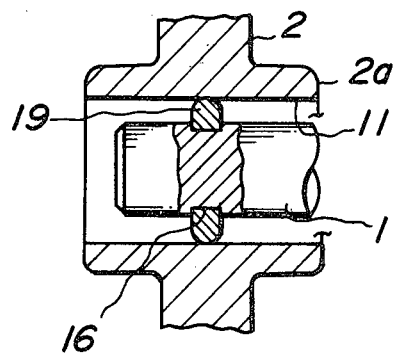

FIG. 10 shows a ninth embodiment of the invention wherein a separate annular ridge body, is composed of a ring 19 having a flat inner surface and is press fitted in an annular groove 16 square in section and formed around the peripheral surface of the fork rod 1. For this purpose, the annular ridge body 19 is formed of a spring steel having an inner diameter which is the same as a diameter of the annular groove 16. The annular ridge body 19 is cut at its one portion in the circumferential direction thereof so as to make it resiliently deformable in the radial direction thereof.

Figure 11:
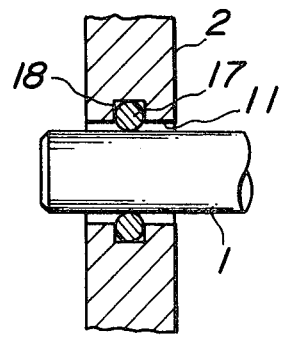

FIG. 11 shows a tenth embodiment of the invention wherein a separate annular ridge body is composed of a ring 17 which is circular in section. The ring 17 is formed of a spring steel and cut at its one portion in the circumferential direction thereof. As a result, the ring 17 becomes resiliently deformable in the radial direction thereof and fitted into an annular groove 18 which is square in section and formed along the periphery of the supporting hole 3 of the transmission case wall 2. The inner peripheral portion of the ring 17 functions to support the fork rod 1. In the embodiments shown in FIGS. 7 to 11, the annular ridge body is formed of material which is different from the constitutional material of the fork rod 1 or transmission case wall 2 and hence may be formed of material selected such that the material is well matched to respective characteristics of the transmission case wall 2 and slidable fork rod 1.

As stated hereinbefore, the fork rod supporting device according to the invention is capable of absorbing an inclining force imposed on a fork rod 1 by means of a ridge-shaped portion 9, 9' 17, 19 and substantially freely permitting the fork rod 1 to deform.

As a result, the device according to the invention can prevent resistance against the sliding movement of the fork rod 1 from being increased and can operate the fork rod 1 in a smooth manner.

What is claimed is:

1. In a device for slidably supporting a fork rod in a manually operable transmission wherein the fork rod is slidably supported at both its ends by supporting holes provided in transmission case walls, the improvement comprising a ridge-shaped portion interposed between said fork rod and said supporting holes, said ridge-shaped portion having a width which is smaller than that of said transmission case wall in the axial direction of said fork rod.

2. The device according to claim 1, wherein said ridge-shaped portion is composed of an annular ridge made integral with the peripheral surface of said supporting hole.

3. The device according to claim 2, wherein said annular ridge is arcuate in section.

4. The device according to claim 2, wherein said annular ridge is formed at one side of the peripheral surface of said supporting hole, the other side of the peripheral surface of said supporting hole forming a tapered hole.

5. The device according to claim 1, wherein said ridge-shaped portion is composed of an annular ridge made integral with the peripheral surface of said fork rod.

6. The device according to claim 1, wherein said ridge-shaped portion is composed of a separate annular ridge body.

7. The device according to claim 6, wherein said separate annular ridge body is fitted under pressure to the peripheral surface of said supporting hole provided in said transmission case wall.

8. The device according to claim 7, wherein said separate annular ridge body is provided at that surface thereof which is opposed to a fork rod with a ridge which is arcuate in section.

9. The device according to claim 7, wherein said separate annular ridge body is composed of a ring having a flat inner surface and firmly fitted on the peripheral surface of said rocker rod.

10. The device according to claim 9, wherein said ring is fitted under pressure in an annular groove square in section and formed along the peripheral surface of said rocker rod.

11. The device according to claim 7, wherein said separate annular ridge body is composed of a ring which is circular in section and firmly fitted in an annular groove square in section and formed along the peripheral surface of said supporting hole.

* * * * *